United States Patent
Banerjea

(10) Patent No.: US 9,118,103 B1
(45) Date of Patent: Aug. 25, 2015

(54) POSITION DETERMINATION USING TRANSMIT BEAMFORMING

(75) Inventor: Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 383 days.

(21) Appl. No.: 13/478,555

(22) Filed: May 23, 2012

Related U.S. Application Data

(60) Provisional application No. 61/491,691, filed on May 31, 2011.

(51) Int. Cl.
*H01Q 3/00* (2006.01)

(52) U.S. Cl.
CPC ........................................ *H01Q 3/00* (2013.01)

(58) Field of Classification Search
CPC .................................. H01Q 3/00; H04B 7/00
USPC .................................................. 342/368, 367
See application file for complete search history.

(56) References Cited

U.S. PATENT DOCUMENTS

| | | | |
|---|---|---|---|
| 2002/0146983 A1* | 10/2002 | Scherzer et al. | 455/67.1 |
| 2006/0221920 A1* | 10/2006 | Gopalakrishnan et al. | 370/338 |
| 2010/0124212 A1* | 5/2010 | Lo | 370/338 |
| 2010/0277368 A1* | 11/2010 | Ponnuswamy | 342/367 |
| 2011/0090885 A1* | 4/2011 | Safavi | 370/338 |

OTHER PUBLICATIONS

IEEE Std 802.11g/D2.8.2; Apr. 2003; (Supplement to ANSI/IEEE Std 802.11, 1999 (Reaff 2003)); Draft Supplement to Standard [for] Information Technology-Telecommunications and information exchange between systems-Local and metropolitan area networks-Specific requirements- Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11a-1999 (Supplement to IEEE Std 802.11-1999); Supplement to IEEE Standard for Information technology- Telecommunications and information exchange between systems—Local and metropolitan area networks—Specific requirements—Part 11: Wireless LAN Medium Access Control (MAC) and Physical Layer (PHY) specifications: High-speed Physical Layer in the 5 Ghz Band; LAN/MAN Standards Committee of the IEEE Computer Society; Sep. 16, 1999; 91 pages.

IEEE Std 802.11b-1999 (Supplement to ANSI/IEEE Std 802.11, 1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999; 96 pages.

(Continued)

*Primary Examiner* — Harry Liu

(57) ABSTRACT

Apparatus having corresponding methods and computer-readable media comprise: a receiver configured to receive a wireless signal transmitted by an access point, wherein the wireless signal includes one or more transmit beamforming parameters used by the access point to transmit the wireless signal; wherein a location of the apparatus is determinable based, at least in part, on i) the one or more transmit beamforming parameters included in the wireless signal, and ii) a location of the access point.

18 Claims, 13 Drawing Sheets

(56) References Cited

OTHER PUBLICATIONS

IEEE P802.11e/D11.0, Oct. 2004 (Amendment to ANSI/IEEE Std 802.110-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements Part 11: Wireless Medium Access Control (MAC) and Physical Layer (PHY) specifications: Amendment 7: Medium Access Control (MAC) Quality of Service (QoS) Enhancements; LAN/MAN Committee of the IEEE Computer Society; 195 pages.

ISO/IEC 8802-11 ANSI/IEEE Std 802.11 First Edition 1999-00-00; Information technology—Telecommunications and information exchange between systems—Local and metropolitan area networks—Specific requirements Part 11: Wireless Lan Medium Access Control (MAC) and Physical Layer (PHY) specifications; 531 pages.

IEEE Std 802.11i/D3.0, Nov. 2002 (Draft Supplement to ISO/IEC 8802-11/1999(I) ANSI/IEEE Std 802.11, 1999 edition); Draft Supplement to Standard for Telecommunications and Information Exchange Between Systems—LAN/MAN Specific Requirements—Part 11: Wireless Medium Access Control (MAC) and physical layer (PHY) specifications: Specification for Enhanced Security Sponsored by the IEEE 802 Committee of the IEEE Computer Society; 208 pages.

IEEE 802.11-04/088916; IEEE P802.11 Wireless LANs; TGn Sync Proposal Technical Spoecification; Syed Aoe Mujitaba; Agere Systems Inc.; May 18, 2005; 134 pages.

IEEE P802.11ac/D2.0, Jan., 2002; Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz; Prepared by the 802.11 Working Group of the 802 Committee; 359 pages.

IEEE P802.11kI137.0, Jan., 2007; Draft Standard for Information Technology—Telecommunications and information exchange between systems—Local and metropolitan area networks—Specific requirements Part 11: Wireless LAN Medium Access Control (MAC) and Physical Layer (PHY) specifications Amendment: Radio Resource Measurement; LAN/MAN Standards Committee of the IEEE Computer Society; 194 pages.

IEEE P802.11w/D4.0, Nov., 2007; Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 5: Protected Management Frames; Prepared by IEEE 802 Committee of the IEEE Computer Society; 63 pages.

IEEE P802.11v/D14.0, Aug., 2010; Draft Standard for Information technology—Telecommunications and information exchange between systems—Local and metropolitan area networks—Specific requirements—Part 11: Wireless LAN Medium Access Control (MAC) and Physical Layer (PHY) specifications Amendment 8: IEEE 802.11 Wireless Network Managment; Prepared by the LAN/MAN Standards Committee of the IEEE Computer Society; 426 pages.

* cited by examiner

| Category | Action | Dialog Token | Location Parameters Element |
|---|---|---|---|

Octets:   1   1   1   variable

FIG. 13

| Category | Action | Location Parameters Element | Measurement Report Element (optional) |
|---|---|---|---|

Octets:   1   1   variable   variable

FIG. 15

| Subelement ID | Length | Indication Multicast Address | Report Interval Units | Normal Report Interval | Normal Number of Frames per Channel |
|---|---|---|---|---|---|
| 1 | 1 | 6 | 1 | 2 | 1 |

Octets:

| In-Motion Report Interval | In-Motion Number of Frames per Channel | Burst Interframe Interval | Tracking Duration | ESS Detection Interval |
|---|---|---|---|---|
| 2 | 1 | 1 | 1 | 1 |

Octets:

*FIG. 14*

| Subelement ID | Length | Transmit Power | Antenna ID | Antenna Gain | RSNI | RCPI |
|---|---|---|---|---|---|---|
| 1 | 1 | 1 | 1 | 1 | 1 | 1 |

Octets:

FIG. 16

| Subelement ID | Length | TOD Timestamp | TOD RMS | TOD Clock Rate |
|---|---|---|---|---|
| 1 | 1 | 4 | 2 | 2 |

Octets:

FIG. 17

POSITION DETERMINATION USING TRANSMIT BEAMFORMING

CROSS-REFERENCE TO RELATED APPLICATIONS

This disclosure claims the benefit of U.S. Provisional Patent Application Ser. No. 61/491,691, filed May 31, 2011, entitled "Indoor Positioning Using Transmit Beam Steering," the disclosure thereof incorporated by reference herein in its entirety.

FIELD

The present disclosure relates to the field of position determination.

BACKGROUND

Many modern mobile devices have positioning capabilities. These capabilities have many uses, for example, to provide the location to a user, to locate a lost mobile device, to provide location-based services to a user, and the like. One of the most popular positioning technologies is provided by a global positioning system (GPS). With GPS, a GPS receiver in a mobile device measures a timing of GPS signals transmitted by multiple GPS satellites, and determines a position of the GPS receiver through trilateration. The principal disadvantage of GPS technology is that the GPS signals typically experience high path loss in some environments, for example indoors, in urban canyons, and the like, thereby potentially rendering the technology ineffective in such environments.

SUMMARY

In general, in one aspect, an embodiment features an apparatus comprising: a receiver configured to receive a wireless signal transmitted by an access point, wherein the wireless signal includes one or more transmit beamforming parameters used by the access point to transmit the wireless signal; wherein a location of the apparatus is determinable based, at least in part, on i) the one or more transmit beamforming parameters included in the wireless signal, and ii) a location of the access point.

In general, in one aspect, an embodiment features a method for a wireless device, the method comprising: receiving a wireless signal transmitted by an access point, wherein the wireless signal includes one or more transmit beamforming parameters used by the access point to transmit the wireless signal; wherein a location of the wireless device is determinable based on i) the one or more transmit beamforming parameters, and ii) a location of the access point.

In general, in one aspect, an embodiment features computer-readable media embodying instructions executable by a computer to perform functions comprising: determining a location of a wireless device based on a location of an access point and one or more transmit beamforming parameters used by the access point to transmit a wireless signal to the wireless device, wherein the wireless signal includes the one or more transmit beamforming parameters.

The details of one or more implementations are set forth in the accompanying drawings and the description below. Other features will be apparent from the description and drawings, and from the claims.

DESCRIPTION OF DRAWINGS

FIG. 13 shows the format of the IEEE 802.11v Location Configuration Request Frame.

FIG. 14 shows the format of the IEEE 802.11v Location Indication Parameters subelement.

FIG. 15 shows the format of the IEEE 802.11v Location Track Notification Frame.

FIG. 16 shows the format of the IEEE 802.11v Radio Information subelement.

FIG. 17 shows the format of the IEEE 802.11v Time Of Departure subelement.

Figure 1:
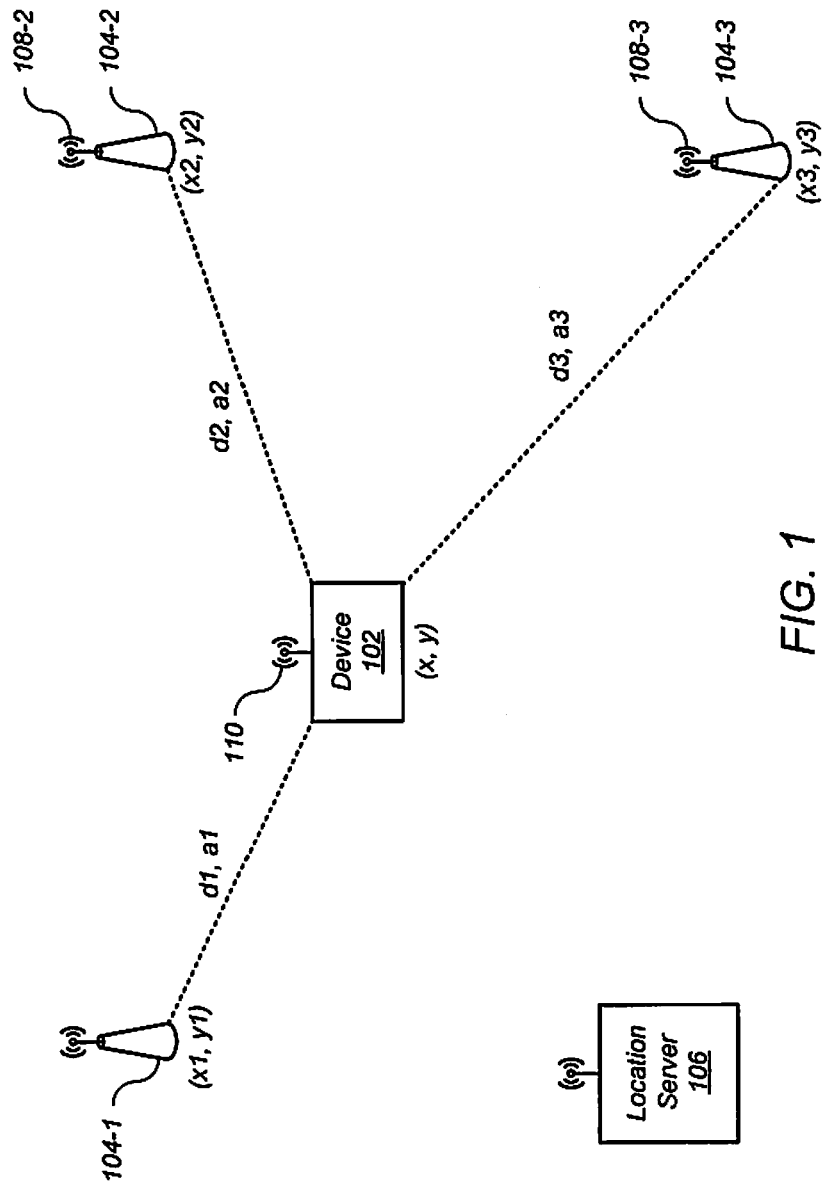
FIG. 1 shows elements of a position determination system according to one embodiment.

The leading digit(s) of each reference numeral used in this specification indicates the number of the drawing in which the reference numeral first appears.

DETAILED DESCRIPTION

Embodiments of the present disclosure provide position determination using transmit beamforming. According to these embodiments, one or more access points transmit wireless signals using transmit beamforming. The wireless signals include the beamforming parameters used to transmit the wireless signals. For example, the wireless signals can indicate the antenna pattern used to transmit the wireless signals. A wireless device receives and processes the wireless signals. In particular, the wireless device obtains the beamforming parameters used to transmit the wireless signals. The wireless device uses the beamforming parameters to determine an angle for each access point. The location of the wireless device is determined based on one or more of the angles. The location determination can also include distances determined between the wireless device and the access points. The distances can be determined by time-of-flight of the wireless signals, signal strength measurements of the wireless signals by the wireless device, and the like. The location determination can be performed by the wireless device or by a location server remote from the wireless device.

As used herein, the term "server" generally refer to an electronic device or mechanism. As used herein, the term "mechanism" refers to hardware, software, or any combination thereof. These terms are used to simplify the description that follows. The servers and mechanisms described herein can be implemented on any standard general-purpose computer, or can be implemented as specialized devices. Furthermore, while some embodiments are described with reference to a client-server paradigm, other embodiments employ other paradigms, such as peer-to-peer paradigms and the like.

FIG. 1 shows elements of a position determination system 100 according to one embodiment. Although in the described embodiments the elements of position determination system 100 are presented in one arrangement, other embodiments may feature other arrangements. For example, various elements of position determination system 100 can be implemented in hardware, software, or combinations thereof. Referring to FIG. 1, position determination system 100 includes device 102, three access points 104-1, 104-2, and 104-3, and a location server 106. Access points 104-1, 104-2, and 104-3 transmit wireless signals 108-1, 108-2, and 108-3, respectively. Device 102 transmits wireless signals 110. Location server 106 can communicate with access points 104 wirelessly, by wired link, or the like.

In some embodiments, location server 106 determines the position of device 102. In other embodiments, device 102 determines its own position, so location server 106 is not required. Device 102 can be any sort of device capable of performing the functions described herein for device 102. In most cases, device 102 is a mobile device. However, in some cases device 102 is a fixed device. Device 102 can be implemented in an electronic device such as a smartphone, tablet or other computer, or the like.

In the described embodiment, access points 104 provide one or more IEEE 802.11 wireless local-area networks (WLANs). However, other embodiments are not limited to IEEE 802.11 WLANs or to network communications. Furthermore, other numbers of access points can be used. For example, if only one access point 104 is available, location information obtained from that access point 104 can be combined with location information from other sources to determine the position of device 102.

Access points 104-1, 104-2, and 104-3 have known locations (x1, y1), (x2, y2) and (x3, y3), respectively. Device 102 has an unknown location (x, y). In some embodiments, distances are computed between device 102 and one or more of the access points 104. The respective distances d1, d2, and d3 for access points 104-1, 104-2, and 104-3 are given by equations (1), (2), and (3), respectively.

$$d1 = \sqrt{(x-x1)^2 + (y-y1)^2} \quad (1)$$

$$d2 = \sqrt{(x-x2)^2 + (y-y2)^2} \quad (2)$$

$$d3 = \sqrt{(x-x3)^2 + (y-y3)^2} \quad (3)$$

In some embodiments, these distances are obtained by time-of-flight measurements. For example, the signal 108 transmitted by an access point 104 includes a timestamp indicating a time of departure of the signal 108 from access point 104. Device 102 measures the time of arrival of the signal 108 at device 102, and computes the time of flight as the difference between the time of departure and the time of arrival. In some embodiments, wireless device 102 measures the received signal strengths of signals 108, and determines the distances based on those measurements.

In some embodiments, angles are computed between device 102 and one or more of the access points 104 with reference to a chosen reference angle, for example, magnetic North. The respective angles a1, a2, and a3 for access points 104-1, 104-2, and 104-3 are given by equations (4), (5), and (6), respectively.

$$a1 = \tan^{-1}\left(\frac{y-y1}{x-x1}\right) \quad (4)$$

$$a2 = \tan^{-1}\left(\frac{y-y2}{x-x2}\right) \quad (5)$$

$$a3 = \tan^{-1}\left(\frac{y-y3}{x-x3}\right) \quad (6)$$

Figure 2:
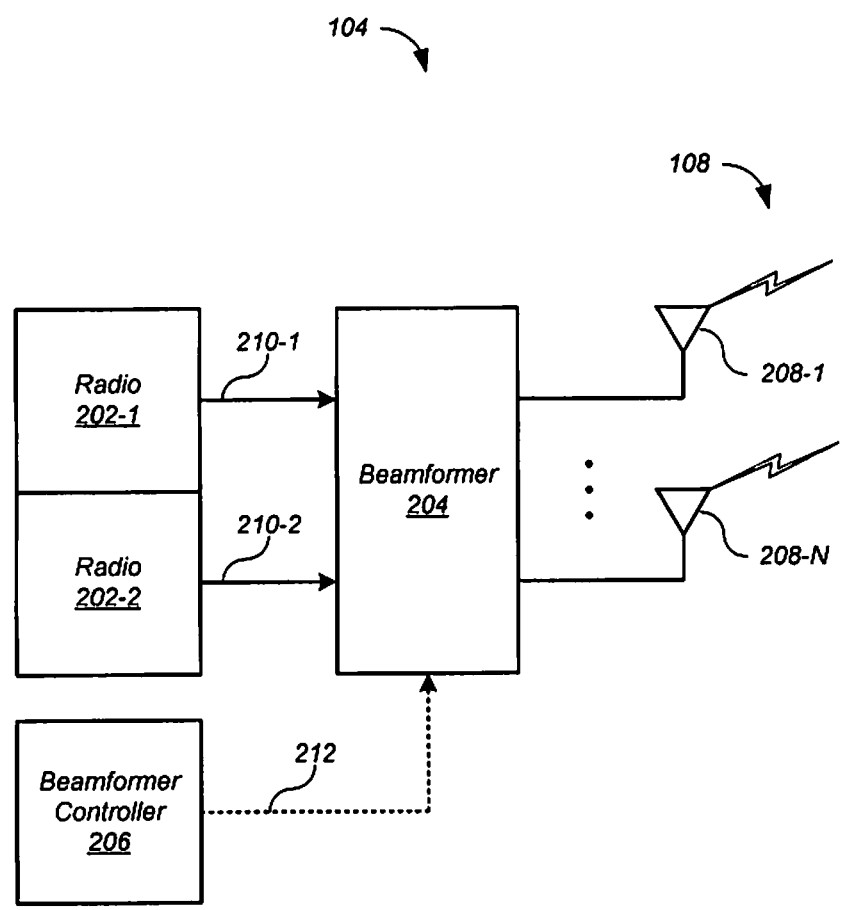
FIG. 2 shows elements of an access point that is capable of transmit beamforming according to one embodiment.

In some embodiments, the angles represent transmit beamforming parameters employed by access points 104 when transmitting the signals 108. Many modern access points 104 have multiple antennas, and are capable of transmit beamforming. FIG. 2 shows elements of an access point 104 that is capable of transmit beamforming according to one embodiment. Although in the described embodiments the elements of access points 104 are presented in one arrangement, other embodiments may feature other arrangements. For example, various elements of access points 104 can be implemented in hardware, software, or combinations thereof. In addition, while access point 104 is described as having two radios, this is not required. Various embodiments apply to access points 104 having three or more radios as well. Access points 104 can be compliant with all or part of IEEE standard 802.11, including draft and approved amendments such as 802.11a, 802.11b, 802.11e, 802.11g, 802.11i, 802.11k, 802.11n, 802.11v, and 802.11w.

Referring to FIG. 2, access point 104 includes two radios 202-1 and 202-2, a beamformer 204, a beamformer controller 206, and N antennas 208-1 through 208-N that transmit wireless signals 108. Each radio 202 generates a respective signal 210-1, 210-2 to be transmitted. Beamformer 204 performs transmit beamforming on the signals 210 in accordance with a control signal 212 provided by beamformer controller 206. Antennas 208 transmit the beamformed wireless signals 108.

Beamformer 204 can be implemented in any conventional manner. For example, beamformer 204 can employ predetermined phase delays for each antenna 208. The phase delays can be implemented in the frequency domain or in the time domain. For example, in some embodiments, a time domain delay is applied as a constant phase ramp in the frequency domain. In other embodiments the phase delays are applied in the frequency domain, as described below.

Referring again to FIGS. 1 and 2, using transmit beamforming, an access point 104 can transmit signals 108 with more energy focused in a predetermined direction. For example, an access point with four antennas 208 can transmit 10 log 4=6 dB more power in one sector that another. According to various embodiments, knowledge of the transmit beamforming parameters used by an access point 104 to transmit a signal 108, along with measurements taken by device 102 of that signal 108, can be used to determine a relative angle between the device 102 and the access point 104. In some embodiments, the transmit beamforming parameters include the identity of the antenna pattern used by access point 104 to transmit signals 108.

Figure 4:
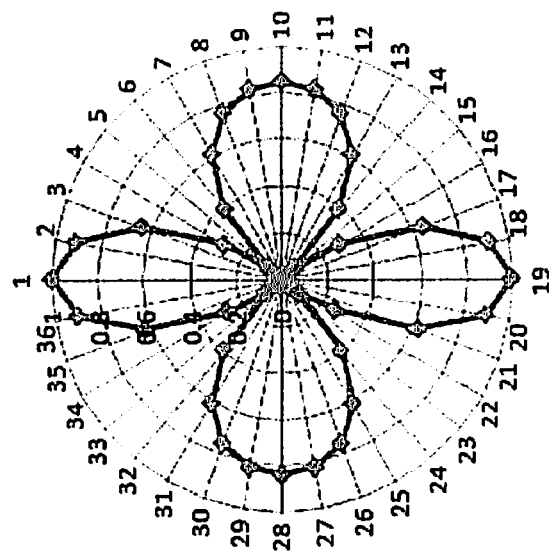
FIGS. 3-10 show antenna patterns that can be produced by one radio and two antennas.
Figure 3:
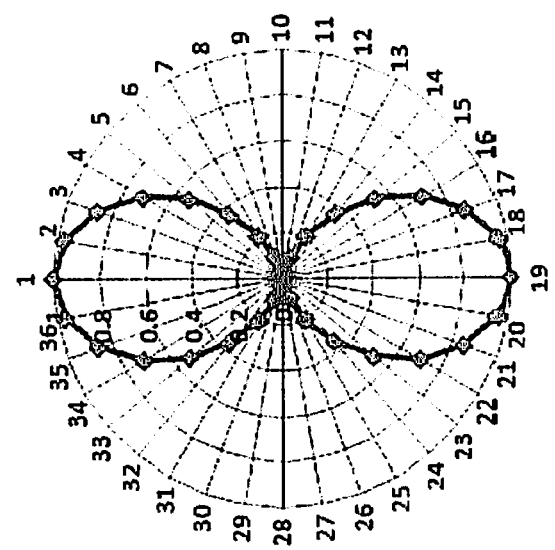
Figure 6:
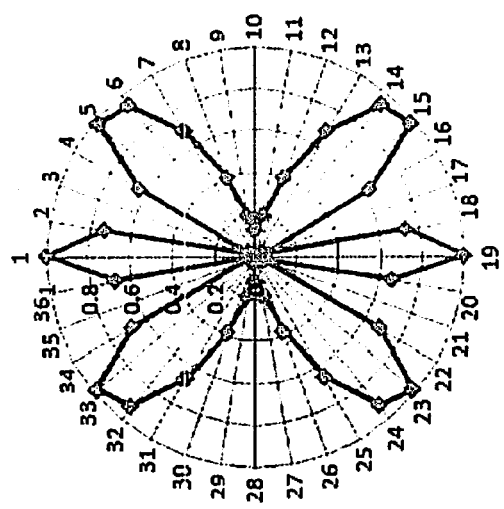
Figure 5:
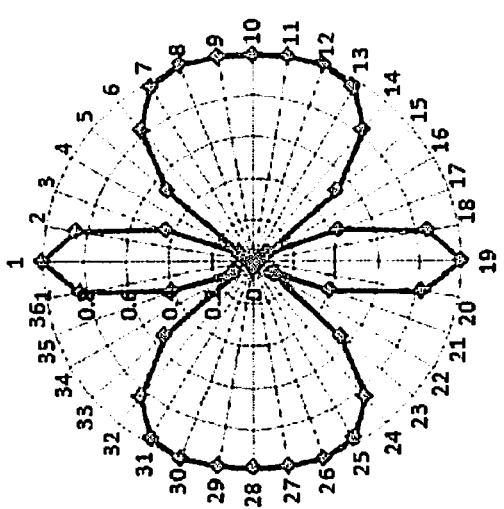

FIGS. 3-10 show antenna patterns that can be produced by one radio 202 and two antennas 208. FIGS. 3-6 show antenna patterns where antennas 208 are separated by half a wavelength (λ/2). FIG. 3 shows an antenna pattern with no relative delay imposed between antennas 208. FIG. 4 shows an antenna pattern with a delay of 0.32λ imposed on one antenna 208. FIG. 5 shows an antenna pattern with a delay of 0.64λ imposed on one antenna 208. FIG. 6 shows an antenna pattern with a delay of λ imposed on one antenna 208.

Figure 8:
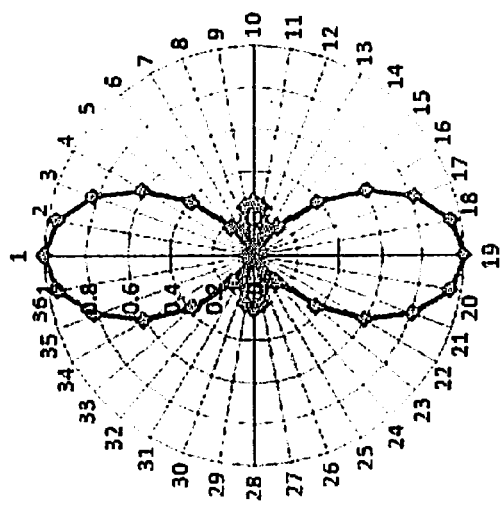
Figure 7:
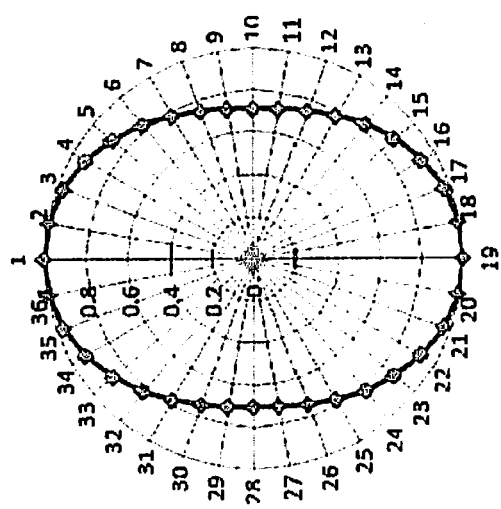
Figure 10:
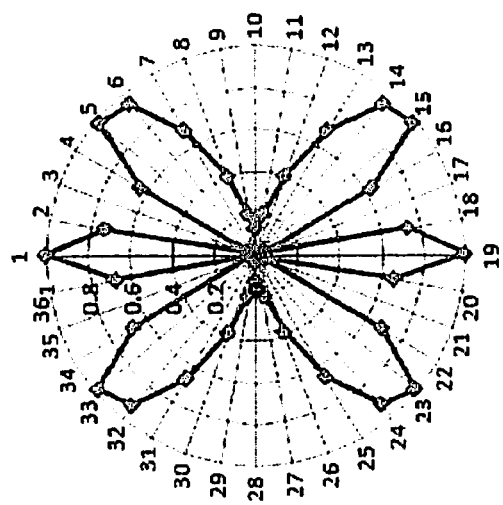
Figure 9:
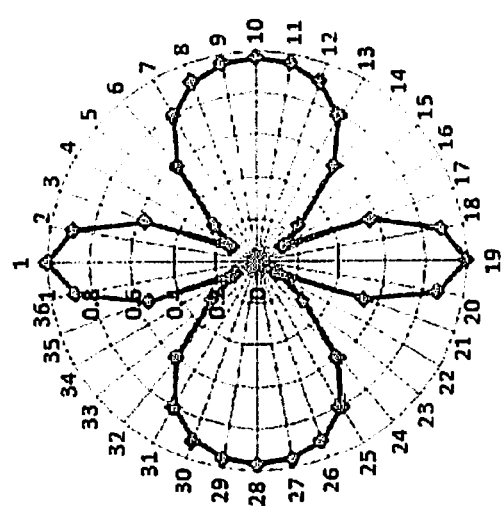

FIGS. 7-10 show antenna patterns where antennas 208 are separated by a quarter of a wavelength (λ/4). FIG. 7 shows an antenna pattern with no relative delay imposed between antennas 208. FIG. 8 shows an antenna pattern with a delay of 0.32λ imposed on one antenna 208. FIG. 9 shows an antenna pattern with a delay of 0.64λ imposed on one antenna 208. FIG. 10 shows an antenna pattern with a delay of λ imposed on one antenna 208.

From the examples of FIGS. 3-10 it is clear that a device 102 at a particular relative angle to an access point 104 will measure a larger RSSI with some antenna patterns than with others. Such measurements, combined with knowledge of the antenna pattern measured, allow accurate determination of that angle. The antenna patterns can be chosen based on directionality. For example, the antenna pattern of FIG. 8 provides better directionality than the antenna pattern of FIG. 7. The calibration of the antennas 208 of the access points 104 can be done during production time. In one embodiment, the antennas transmit a signal with an increasing frequency ramp, which corresponds to a time delay. The effective antenna pattern can be measured using a turntable. The frequency ramps that correspond to directionality in specific directions are selected. Predetermined antenna IDs and antenna gains are assigned to the selected frequency ramps. The antenna ID can be transmitted in the physical layer convergence procedure (PLPC) protocol data unit (PPDU).

Figure 11:
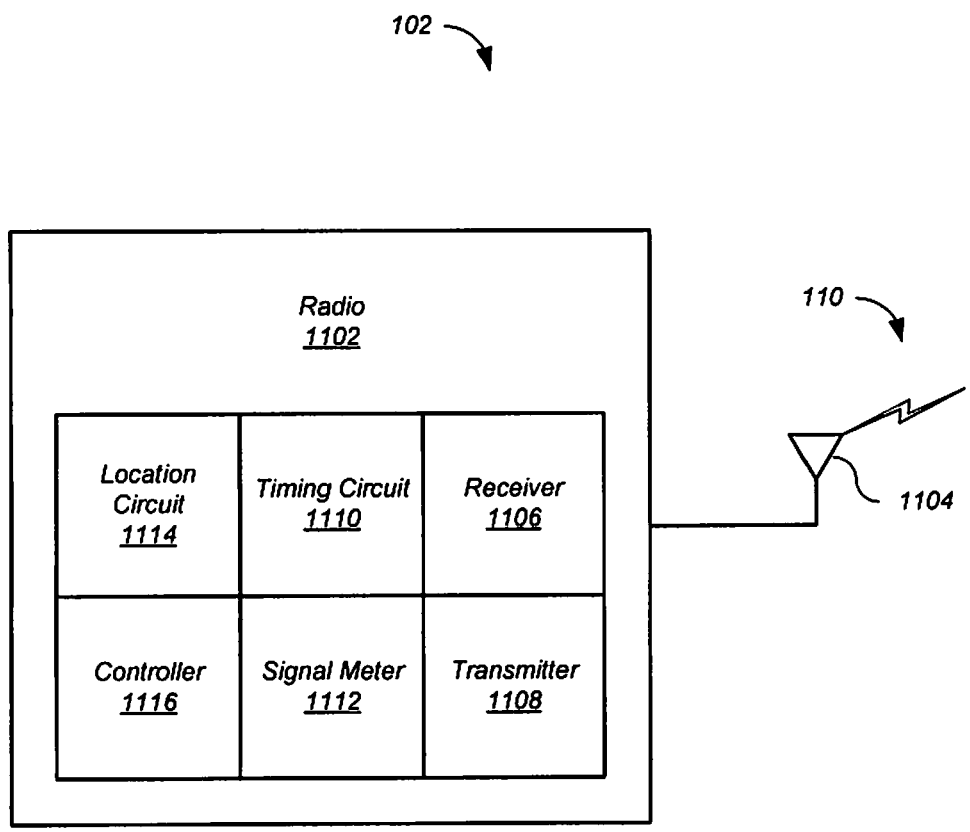
FIG. 11 shows elements of the device of FIG. 1 according to one embodiment.

FIG. 11 shows elements of device 102 according to one embodiment. Although in the described embodiments the elements of device 102 are presented in one arrangement, other embodiments may feature other arrangements. For example, various elements of device 102 can be implemented in hardware, software, or combinations thereof.

Referring to FIG. 11, device 102 includes a radio 1102 and an antenna 1104. Radio 1102 includes a receiver 1106, a transmitter 1108, a timing circuit 1110, a signal meter 1112, a location circuit 1114, and a controller 1116. In some embodiments, location circuit 1114 determines the position of device 102. In other embodiments, location server 106 determines the position of device 102, so location circuit 1114 is not required. In some embodiments, time-of-flight measurements are not used. In such embodiments, timing circuit 1110 is not required. Location circuit 1114 and controller 1116 can be implemented as one or more processors. Processors according to various embodiments can be fabricated as one or more integrated circuits. Device 102 can be compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 12:
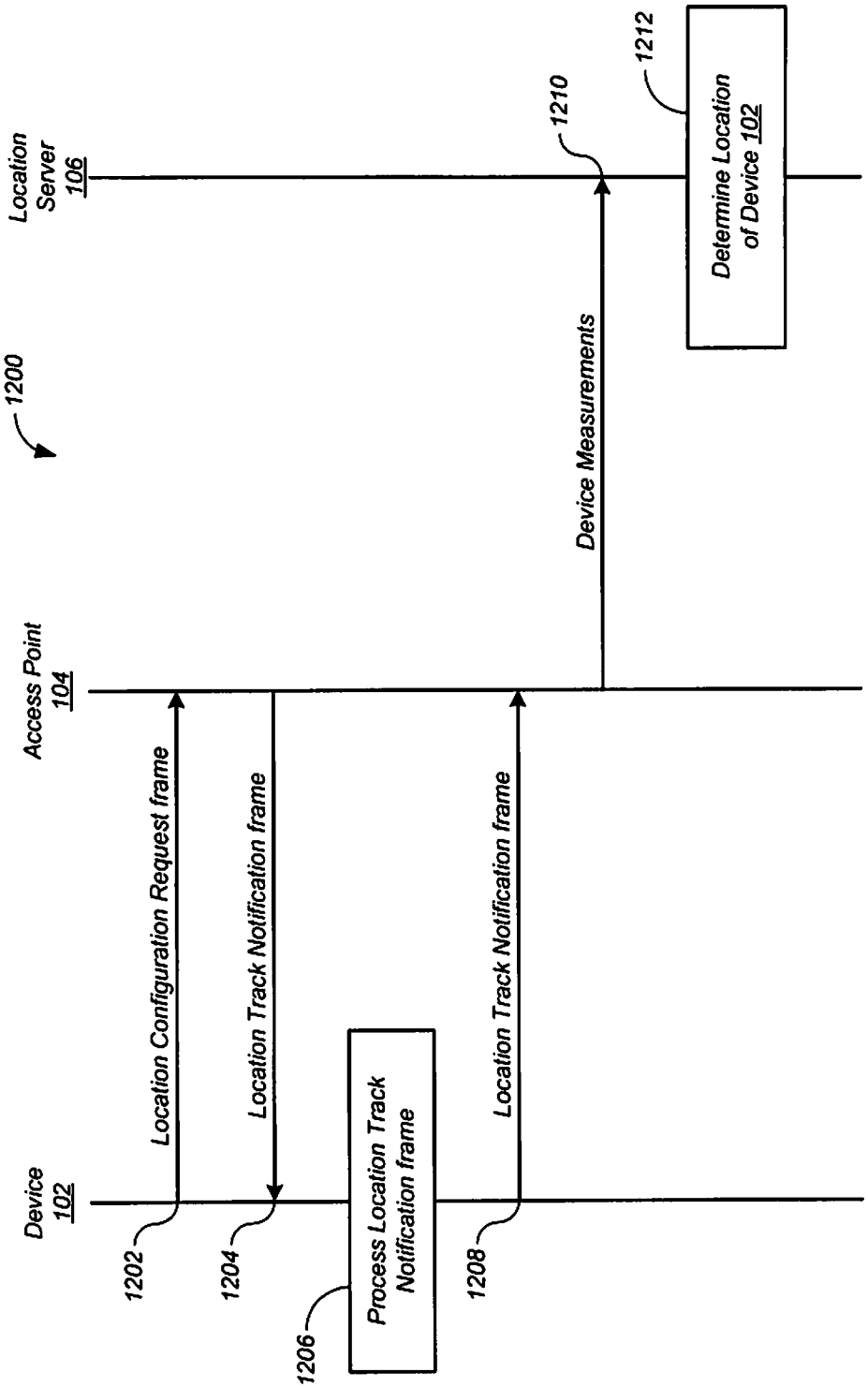
FIG. 12 shows a process for the position determination system of FIG. 1 according to an embodiment where the device measures signals transmitted by the access point, and the location server determines the location of the device using those measurements.

In some embodiments, device 102 measures signals 108 transmitted by access point 104, and location server 106 determines the location of device 102 using those measurements. FIG. 12 shows a process 1200 for position determination system 100 of FIG. 1 according to one such embodiment. Although in the described embodiments the elements of process 1200 are presented in one arrangement, other embodiments may feature other arrangements. For example, in various embodiments, some or all of the elements of process 1200 can be executed in a different order, concurrently, and the like. Also some elements of process 1200 may not be performed, and may not be executed immediately after each other.

Referring to FIG. 12, at 1202 device 102 transmits a wireless signal 110 that represents an IEEE 802.11v Location Configuration Request Frame. FIG. 13 shows the format of the IEEE 802.11v Location Configuration Request Frame. The Location Configuration Request Frame includes a one-octet Category field, a one-octet Action field, a one-octet Dialog Token field, and a variable-length Location Parameters Element. The Category field is the value indicating the Wireless Network Management category. The Action field is the value indicating Location Configuration Request. The Dialog Token field is a nonzero value that is unique among the Location Configuration Request frames sent to each destination MAC address for which a corresponding Location Configuration Response frame has not been received.

One of the Location Parameters subelements is the Location Indication Parameters subelement. FIG. 14 shows the format of the IEEE 802.11v Location Indication Parameters subelement. The Location Indication Parameters subelement includes a one-octet Subelement ID field, a one-octet Length field, a six-octet Indication Multicast Address field, a one-octet Report Interval Units field, a two-octet Normal Report Interval field, a one-octet Normal Number of Frames per Channel field, a two-octet In-Motion Report Interval field, a one-octet In-Motion Number of Frames per Channel field, a one-octet Burst Interframe Interval field, a one-octet Tracking Duration field, and a one-octet ESS Detection Interval field.

The Location Indication Parameters subelement contains location reporting characteristics for device 102. The Subelement ID field contains the value 1, indicating that the subelement is the Location Indication Parameters subelement. The Length field contains the value 16. The Indication Multicast Address field specifies the destination address to which the Location Track Notification frames are sent in a non-IBSS network. The value of this field is a locally administered multicast address. The field is reserved when Location Track Notifications are transmitted in an IBSS.

The Report Interval Units field contains the units used for the Normal Report Interval field and In-Motion Report Interval field. The Normal Report Interval is the time interval, expressed in the units indicated in the Report Interval Units field, at which access point 104 is expected to transmit one or more Location Track Notification frames. The access point 104 will not transmit Location Track Notification frames when the Normal Report Interval is 0. The Normal Number of Frames per Channel is the number of Location Track Notification frames per channel sent or expected to be sent by access point 104 at each Normal Report Interval.

The In-Motion Report Interval is the time interval, expressed in the units indicated in the Report Interval Units field, at which access point 104 reports its location by sending a Location Track Notification frame when access point 104 is in motion. The In-Motion Number of Frames per Channel is the number of Location Track Notification frames per channel sent or expected to be sent by access point 104 at each In-Motion Report Interval. The Burst Inter-frame Interval is the target time interval, expressed in milliseconds, between the transmissions of each of the Normal or In-Motion frames on the same channel. The Burst Inter-frame interval value is 0 to indicate that frames will be transmitted with no target inter-frame delay.

The Tracking Duration is the amount of time, in minutes, that access point 104 sends the Location Track Notification frames. The duration starts as soon as access point 104 sends a Location Configuration Response frame with a Location Status value of Success. If the Tracking Duration value is a non-zero value access point 104 will send Location Track Notification Frames, based on the Normal and In-Motion Report Interval field values, until the duration ends. If the Tracking Duration is 0 access point 104 will continuously send Location Track Notification frames as defined by Normal and In-Motion Report Interval field values until transmission is terminated.

The ESS Detection Interval is the periodicity, in minutes, that a STA checks for beacons transmitted by one or more access points belonging to the same Extended Service Set (ESS) that configured access point 104. If no beacons from the ESS are received for this period, the STA terminates transmission of Location Track Notification frames. The ESS Detection Interval field is not used when the ESS Detection Interval field value is 0.

At 1204, responsive to the IEEE 802.11v Location Configuration Request Frame transmitted by device 102, access point 104 transmits a wireless signal that represents an IEEE 802.11v Location Track Notification Frame. FIG. 15 shows the format of the IEEE 802.11v Location Track Notification Frame. The Location Track Notification Frame includes a one-octet Category field, a one-octet Action field, a variable-length Location Parameters Element, and an optional variable-length Measurement Report Element. The Category field is the value indicating the WNM category. The Action field is the value indicating Location Track Notification. The Parameters Element field contains the Location Parameters subelements. The Measurement Report Element is optional.

One of the Location Parameters subelements is the Radio Information subelement. FIG. 16 shows the format of the IEEE 802.11v Radio Information subelement. The Radio Information subelement includes a Subelement ID field, a Length field, a Transmit Power field, an Antenna ID field, an Antenna Gain field, a RSNI field, and a RCPI field. Each field is one octet in length.

The Subelement ID field contains the value 4, indicating that the subelement is the Radio Information subelement. The Length field contains the value 5. The Transmit Power field is the transmit power used to transmit the current Location Track Notification frame containing the Location Parameters element with the Radio Information subelement and is a signed integer, reported in dBm. A value of −128 indicates that the transmit power is unknown.

The Antenna ID field is described below.

The Antenna Gain field is the antenna gain of the antenna (or group of antennas) over which the Location Track Notification frame is transmitted and is a signed integer, reported in dB. A value of −128 indicates that the antenna gain is unknown. The RSNI field contains the received signal to noise indication (RSNI) value (dB) measured against the most recently received Location Configuration Request frame requesting that a Radio Information subelement be included in the Location Track Notification frame. A value of 255 indicates that the RSNI value is unknown or is not used. The RCPI field contains the received channel power indication (RCPI) value (dBm) measured against the most recently received Location Configuration Request frame requesting that a Radio Information subelement be included in the Location Track Notification frame. A value of 255 indicates that the RCPI value is unknown or is not used.

According to IEEE 802.11v, the Antenna ID field identifies the antenna(s) used to transmit the Location Track Notification frame. However, in the described embodiments, the Antenna ID filed is not used in this manner. Instead, in the described embodiments, the Antenna ID field is used to indicate the antenna pattern used to transmit the Location Track Notification frame. For example, each of the antenna patterns in FIGS. 3-10 can be assigned a different integer in the range 0-255. When an antenna pattern is used to transmit a Location Track Notification frame, the corresponding integer is placed in the Antenna ID field of that frame.

In embodiments that employ time-of-flight measurements, the Location Track Notification frame includes the Time Of Departure subelement. FIG. 17 shows the format of the IEEE 802.11v Time Of Departure subelement. The Time Of Departure subelement includes a one-octet Subelement ID field, a one-octet Length field, a four-octet TOD Timestamp field, a two-octet TOD RMS field, and a two-octet TOD Clock Rate field.

The Subelement ID field contains the value 7, indicating that the subelement is the Time of Departure subelement. The Length field contains the value 8. The TOD Timestamp field carried within the Location Track Notification frame specifies when the first frame energy is sent by the transmitting port in units equal to 1/TOD Clock Rate, where the TOD Clock Rate is specified in the TOD Clock Rate field. The TOD RMS field specifies the RMS time of departure error in units equal to 1/TOD Clock Rate, where the TOD Clock Rate is specified in the TOD Clock Rate field. The TOD Clock Rate field contains the clock rate used to generate the TOD timestamp value reported in the TOD Timestamp field, and it is specified in units of MHz.

The Location Track Notification frame includes the Location Indication Parameters used by access point 104. If in the Location Configuration Request Frame device 102 requested changes to the Location Indication Parameters, other devices can respond with an IEEE 802.11v Location Configuration Response Frame.

Referring again to FIG. 12, at 1206 device 102 processes the Location Track Notification frame received from access point 104. In particular, antenna 1104 receives the wireless signal 108 representing the Location Track Notification frame. Receiver 1106 receives the Location Track Notification frame into radio 1102. Signal meter 1112 measures the received signal strength of wireless signal 108. Device 102 may receive signals 108 from multiple access points 104. Controller 1116 notes the signal 108 with the highest signal strength, the access point 104 that transmitted that signal 108, and the antenna ID in the Location Track Notification frame conveyed by that signal 108.

In embodiments that employ time-of-flight measurements, timing circuit 1110 measures the time of arrival of signal 108, and notes the time of departure of the frame from access point 104 as presented in the Time Of Departure field of the Time Of Departure subelement of the Location Track Notification frame.

At 1208, device 102 reports the measurements to access point 104. In particular, transmitter 1108 of radio 1102 transmits a wireless signal 110 from antenna 1104. Wireless signal 110 represents a Location Track Notification frame. The Location Track Notification frame includes the antenna ID reported in the strongest signal 108 measured by signal meter 1112. Device 102 may transmit multiple Location Track Notification frames, including the antenna ID and the noise indication (RSNI) value and/or received channel power indication (RCPI) values of multiple received measurement frames, which can be received from multiple access points 104. These Location Track Notification frames can be transmitted to a single access point 104 as well.

In some embodiments, signal meter 1112 of radio 1102 also measures the signal 108 received from access point 104 to obtain a RSNI value and/or a RCPI value. In these embodiments, device 102 includes the RSNI and/or RSPI value(s) in the optional Measurement Report Element of the Location Track Notification frame sent to access point 104 at 1208.

In embodiments that employ time-of-flight measurements, device 102 includes the time of arrival measurement and the reported time of departure, or the difference between the two, in the Location Track Notification frame sent to access point 104 at 1208.

At 1210, access point sends the reported device measurements to location server 106. At 1212, location server 106 determines the location of device 102 using at least the angle information, augmented in some embodiments by distance information such as time-of-flight information, signal strength information, and the like.

Figure 18:
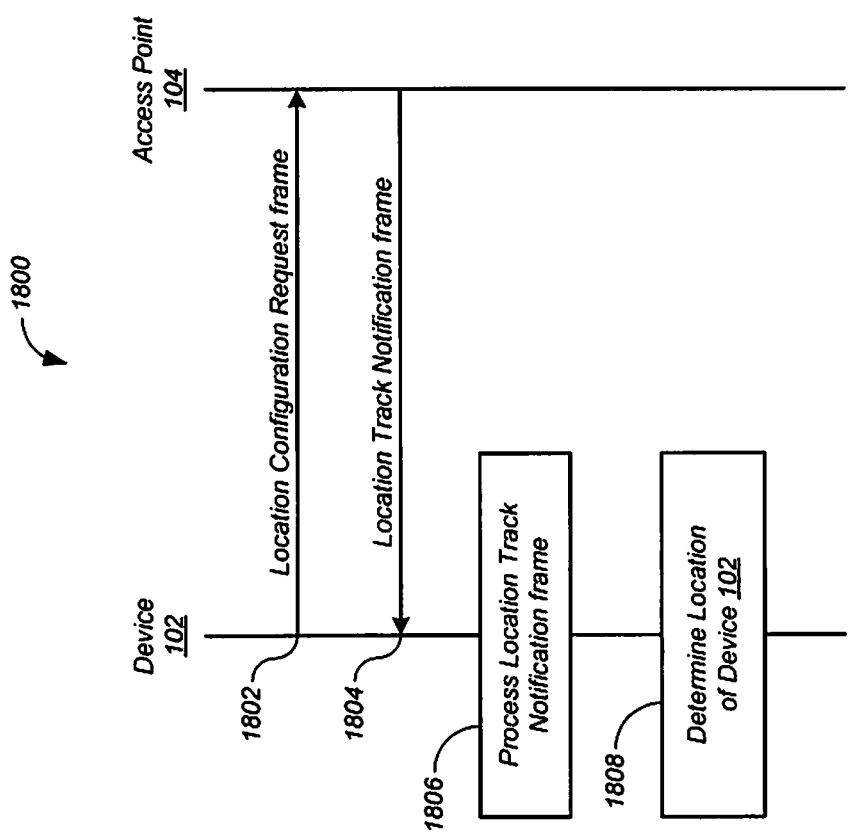
FIG. 18 shows a process for the position determination system of FIG. 1 according to an embodiment where the device measures the signals transmitted by the access point, and determines the location of the device using those measurements.

In some embodiments, device 102 measures signals 108 transmitted by access point 104, and determines the location of device 102 using those measurements. FIG. 18 shows a process 1800 for position determination system 100 of FIG. 1 according to one such embodiment. Although in the described embodiments the elements of process 1800 are presented in one arrangement, other embodiments may feature other arrangements. For example, in various embodiments, some or all of the elements of process 1800 can be executed in a different order, concurrently, and the like. Also some elements of process 1800 may not be performed, and may not be executed immediately after each other.

Referring to FIG. 18, at 1802 device 102 transmits a wireless signal that represents an IEEE 802.11v Location Configuration Request Frame. FIG. 13 shows the format of the IEEE 802.11v Location Configuration Request Frame. At 1204, responsive to the IEEE 802.11v Location Configuration Request Frame transmitted by device 102, access point 104 transmits a wireless signal 108 that represents an IEEE 802.11v Location Track Notification Frame. FIG. 15 shows the format of the IEEE 802.11v Location Track Notification Frame.

The Location Track Notification Frame includes the variable-length Location Parameters Element. One of the Location Parameters subelements is the Radio Information subelement. FIG. 16 shows the format of the IEEE 802.11v Radio Information subelement. The Radio Information subelement includes the Antenna ID field. According to IEEE 802.11v, the Antenna ID field identifies the antenna(s) used to transmit the Location Track Notification frame. However, in the described embodiments, the Antenna ID filed is not used in this manner. Instead, in the described embodiments, the Antenna ID field is used to indicate the antenna pattern used to transmit the Location Track Notification frame. For example, each of the antenna patterns in FIGS. 3-10 can be assigned a different integer in the range 0-255. When an antenna pattern is used to transmit a Location Track Notification frame, the corresponding integer is placed in the Antenna ID field of that frame.

In embodiments that employ time-of-flight measurements, the Location Track Notification frame includes the Time Of Departure subelement. FIG. 17 shows the format of the IEEE 802.11v Time Of Departure subelement. The Time Of Departure subelement includes the TOD Timestamp field.

The Location Track Notification frame includes the Location Indication Parameters used by access point 104. If in the Location Configuration Request Frame device 102 requested changes to the Location Indication Parameters, other devices can respond with an IEEE 802.11v Location Configuration Response Frame.

Referring again to FIG. 18, at 1806 device 102 processes the Location Track Notification frame received from access point 104. In particular, antenna 1104 receives the wireless signal 108 representing the Location Track Notification frame. Receiver 1106 receives the Location Track Notification frame into radio 1102.

Location circuit 1114 determines an angle for access point 104. In particular, signal meter 1112 measures the received signal strength of wireless signal 108. Device 102 may receive signals 108 from multiple access points 104. Controller 1116 notes the signal 108 with the highest signal strength, the access point 104 that transmitted that signal 108, and the antenna ID in the Location Track Notification frame represented by that signal 108. Based on the antenna ID and knowledge of the antenna pattern represented by that antenna ID, location circuit 1114 determines an angle for access point 104.

In embodiments that employ time-of-flight measurements, timing circuit 1110 measures the time of arrival of signal 108, and notes the time of departure of the frame from access point 104 as presented in the Time Of Departure field of the Time Of Departure subelement of the Location Track Notification frame. Location circuit 1114 uses the difference between the time of arrival and the time of departure to compute the distance to access point 104.

Device 102 can also employ signal strength measurements obtained by signal meter 1112 for location determination. Signal meter 1112 measures the received signal strength of the wireless signal 108 representing the Location Track Notification frame transmitted by access point 104 at 1804. Controller 1116 notes the transmit power reported in the Radio Information subelement of that Location Track Notification frame. Based on the received signal strength and transmit power, controller 1116 estimates the signal loss and the corresponding path loss, and determines the distance of device 102 from access point 104.

At 1808, device 102 determines the location of device 102 using at least the angle information, augmented in some embodiments by the computed distance(s) and other information. Device 102 can use information derived from multiple access points 104 to determine the location of device 102. In some embodiments, device 102 also uses location information from other sources to determine the position of device 102.

Figure 19:
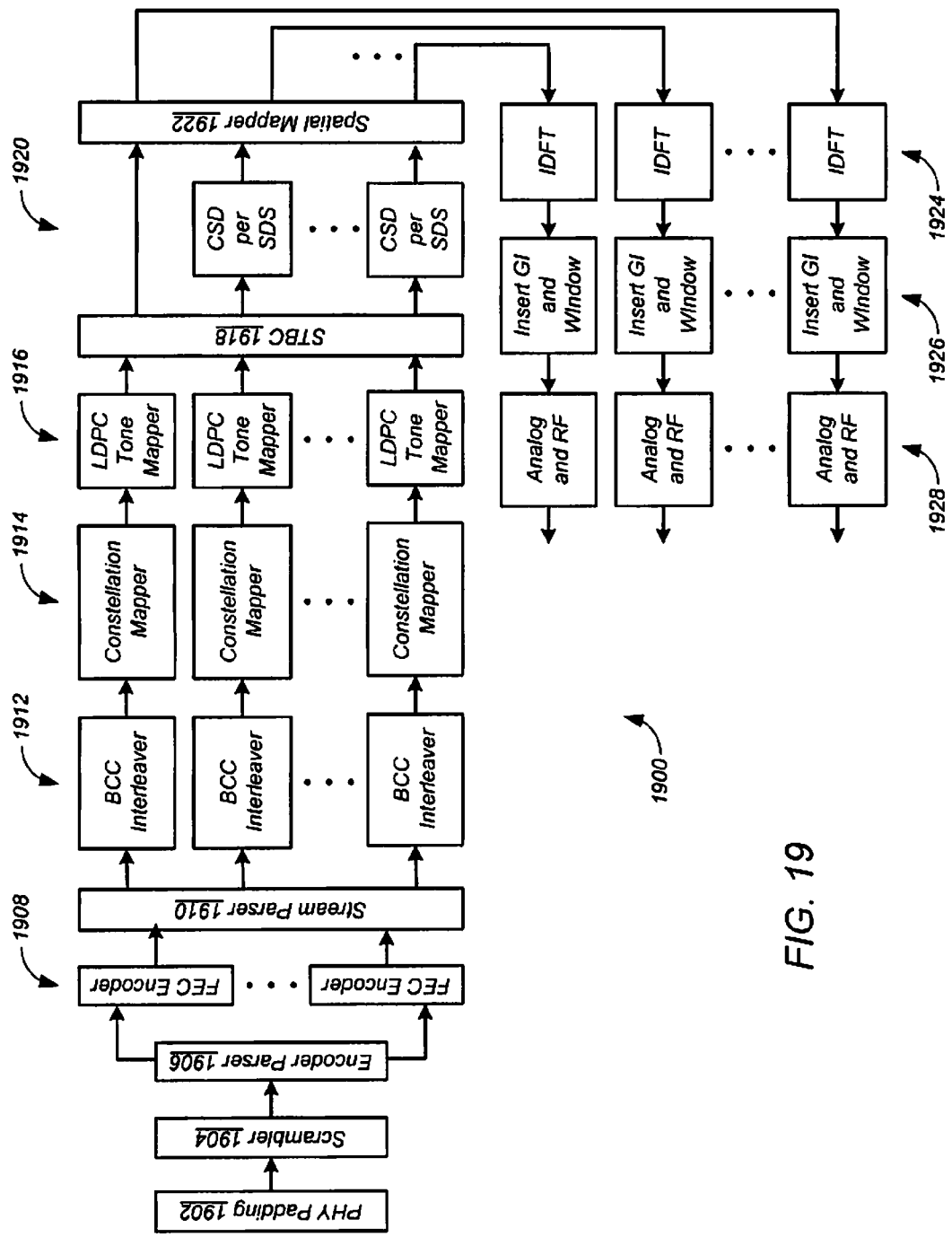
FIG. 19 shows a block diagram of a transmitter drawn from the IEEE 802.11ac draft standard where transmit beamforming is applied in the frequency domain.

In some embodiments the phase delays for transmit beamforming are applied in the frequency domain. FIG. 19 shows a block diagram of one such transmitter 1900 drawn from the IEEE 802.11ac draft standard. Transmitter 1900 includes a physical-layer (PHY) padding block 1902, a scrambler 1904, an encoder parser 1906, forward error correction (FEC) encoders 1908, stream parser 1910, braided convolutional code (BCC) interleavers 1912, constellation mappers 1914, low-density parity-check (LDPC) tone mappers 1916, space-time block coder (STBC) 1918, cyclic shift diversity per space time shift (CSD per STS) blocks 1920, spatial mapper 1922, inverse discrete Fourier transform (IDFT) blocks 1924, insert guard interval (GI) and window blocks 1926, and analog and radio frequency (RF) blocks 1928. There can be 1 to 12 FEC encoders 1908 when BCC encoding is used. Stream parser 1910 can have 1-8 outputs. For streams encoded using LDPC, BCC interleavers 1912 are not used. For streams encoded using BCC, LDPC tone mappers 1916 are not used. When STBC is used, STBC block 1918 has twice as many outputs than inputs. When spatial mapping is used, there can be more transmit chains than space time streams. The number of inputs to spatial mapper 1922 can be 1-8. Note that, in transmitter 1900, the spatial mapping occurs before the IDFT transform.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A network device comprising:
a receiver configured to receive a wireless signal transmitted by an access point, wherein the wireless signal includes one or more transmit beamforming parameters used by the access point to transmit the wireless signal, and wherein the one or more transmit beamforming parameters includes a transmission pattern of the wireless signal as transmitted by an antenna of the access point; and
a circuit configured to determine a location of the network device based on i) the one or more transmit beamforming parameters, ii) the transmission pattern of the wireless signal, and iii) a location of the access point.

2. The network device of claim 1, wherein:
the wireless signal represents an IEEE 802.11v location track notification frame;
the IEEE 802.11v location track notification frame includes a location parameters element;
the location parameters element includes an antenna identifier subelement; and
the antenna identifier subelement includes the one or more transmit beamforming parameters.

3. The network device of claim 1, wherein the transmission pattern of the wireless signal indicates a transmission pattern of two antennas of the access point transmitting the wireless signal.

4. The network device of claim 1, wherein the transmission pattern of the wireless signal indicates a polar radiation plot pattern of the wireless signal as transmitted by the access point.

5. The network device of claim 1, wherein the transmission pattern of the wireless signal indicates radiation in multiple directions.

6. The network device of claim 1, wherein:
the transmission pattern of the wireless signal indicates a transmission pattern provided by transmission of the wireless signal from a first antenna and a second antenna; and
the transmission pattern is indicative of a delay imposed on the first antenna and not on the second antenna.

7. An apparatus comprising:
a receiver configured to receive a wireless signal transmitted by an access point, wherein the wireless signal includes i) one or more transmit beamforming parameters used by the access point to transmit the wireless signal, and ii) time of departure information indicating a time of departure of the wireless signal from the access point; and
a timing circuit configured to determine a time of arrival of the wireless signal at the receiver,
wherein the location of the apparatus is determined based on i) the one or more transmit beamforming parameters, ii) the location of the access point, iii) the time of departure of the wireless signal from the access point, and iv) the time of arrival of the wireless signal at the receiver.

8. The apparatus of claim 7, wherein:
the wireless signal represents an IEEE 802.11v location track notification frame;
the IEEE 802.11v location track notification frame includes a time of departure subelement;
the time of departure subelement includes a time of departure timestamp field; and
contents of the time of departure timestamp field indicate the time of departure of the wireless signal from the access point.

9. The apparatus of claim 7, further comprising a location circuit configured to determine the location of the apparatus based on i) the one or more transmit beamforming parameters, ii) the location of the access point, iii) the time of departure of the wireless signal from the access point, and iv) the time of arrival of the wireless signal at the receiver.

10. A method comprising:
receiving a wireless signal transmitted by an access point at a network device, wherein the wireless signal includes one or more transmit beamforming parameters used by the access point to transmit the wireless signal, wherein the one or more transmit beamforming parameters includes a transmission pattern of the wireless signal as transmitted by an antenna of the access point; and
determining a location of the network device based on i) the one or more transmit beamforming parameters, ii) the transmission pattern of the wireless signal, and iii) a location of the access point.

11. The method of claim 10, wherein:
the wireless signal represents an IEEE 802.11v Location Track Notification Frame;
the IEEE 802.11v Location Track Notification Frame includes a Location Parameters Element;
the Location Parameters Element includes an Antenna ID subelement; and
the Antenna ID subelement includes the one or more transmit beamforming parameters.

12. A method for a wireless device, the method comprising:
receiving a wireless signal transmitted by an access point, wherein the wireless signal includes i) one or more transmit beamforming parameters used by the access point to transmit the wireless signal, and ii) time of departure information indicating a time of departure of the wireless signal from the access point; and
determining a time of arrival of the wireless signal at the wireless device,
wherein a location of the wireless device is determined based on i) the one or more transmit beamforming parameters, ii) the location of the access point, iii) the time of departure of the wireless signal from the access point, and iv) the time of arrival of the wireless signal at the wireless device.

13. The method of claim 12, wherein:
the wireless signal represents an IEEE 802.11v location track notification frame;

the IEEE 802.11v location track notification frame includes time of departure subelement;

the time of departure subelement includes a time of departure timestamp field; and contents of the time of departure timestamp field indicate the time of departure of the wireless signal from the access point.

14. The method of claim 12, further comprising determining the location of the wireless device based on i) the one or more transmit beamforming parameters, ii) the location of the access point, iii) the time of departure of the wireless signal from the access point, and iv) the time of arrival of the wireless signal at the wireless device.

15. A non-transitory computer-readable medium embodying instructions executable by a computer, the instructions comprising:

configuring a receiver in a network device to receive a wireless signal transmitted by an access point, wherein the wireless signal includes one or more transmit beamforming parameters used by the access point to transmit the wireless signal, and wherein the one or more transmit beamforming parameters includes a transmission pattern of the wireless signal as transmitted by an antenna of the access point; and determining a location of the network device based on i) a location of the access point, ii) the transmission pattern of the wireless signal, and iii) the one or more transmit beamforming parameters used by the access point to transmit the wireless signal to the network device.

16. The non-transitory computer-readable medium of claim 15, wherein:

the wireless signal represents an IEEE 802.11v location track notification frame;

the IEEE 802.11v location track notification frame includes a location parameters element;

the location parameters element includes an antenna identifier subelement; and the antenna identifier subelement includes the one or more transmit beamforming parameters.

17. The non-transitory computer-readable medium of claim 15, wherein the instructions further comprise determining a time of arrival of the wireless signal at the network device, wherein:

the wireless signal includes time of departure information;

the time of departure information indicates a time of departure of the wireless signal from the access point; and the determining of the location of the network device is based on i) the time of departure of the wireless signal from the access point, and ii) the time of arrival of the wireless signal at the network device.

18. The non-transitory computer-readable medium of claim 15, wherein the determining of the location of the network device is based on i) a time of departure of the wireless signal from the access point, and ii) a time of arrival of the wireless signal at the network device.

* * * * *